(12) United States Patent
Kishida et al.

(10) Patent No.: US 10,712,149 B2
(45) Date of Patent: Jul. 14, 2020

(54) FIBER OPTIC CABLE FOR MEASURING PRESSURE, TEMPERATURE, AND STRAIN DISTRIBUTIONS

(71) Applicant: Neubrex Co., Ltd., Kobe-shi, Hyogo (JP)

(72) Inventors: Kinzo Kishida, Kobe (JP); Yoshiaki Yamauchi, Kobe (JP); Mitsunori Yokoyama, Kobe (JP)

(73) Assignee: NEUBREX CO., LTD., Kobe-shi, Hyogo (JP)

( * ) Notice: Subject to any disclaimer, the term of this patent is extended or adjusted under 35 U.S.C. 154(b) by 35 days.

(21) Appl. No.: 16/307,727

(22) PCT Filed: Jun. 8, 2016

(86) PCT No.: PCT/JP2016/066989
§ 371 (c)(1),
(2) Date: Dec. 6, 2018

(87) PCT Pub. No.: WO2017/212559
PCT Pub. Date: Dec. 14, 2017

(65) Prior Publication Data
US 2019/0310077 A1    Oct. 10, 2019

(51) Int. Cl.
*G01B 11/16* (2006.01)
*G01D 5/353* (2006.01)
(Continued)

(52) U.S. Cl.
CPC ......... *G01B 11/16* (2013.01); *G01D 5/35361* (2013.01); *G01D 5/35364* (2013.01);
(Continued)

(58) Field of Classification Search
CPC ...... G02B 6/44; G02B 6/3616; G02B 6/3807; G02B 6/3809; G02B 6/381; G02B 6/387;
(Continued)

(56) References Cited

U.S. PATENT DOCUMENTS 4,971,420 A    11/1990  Smith
5,408,562 A *  4/1995  Yoshizawa ........... G02B 6/4408
                                                           385/110

(Continued)

FOREIGN PATENT DOCUMENTS

WO    2014083989 A1    6/2014
WO    2014181617 A1    11/2014
WO    2016063904 A1    4/2016

OTHER PUBLICATIONS

International Search Report (PCT/ISA/210) dated Jul. 19, 2016, by the Japan Patent Office as the International Searching Authority for International Application No. PCT/JP2016/066989.
(Continued)

*Primary Examiner* — Michael P Stafira
(74) *Attorney, Agent, or Firm* — Buchanan Ingersoll & Rooney PC

(57) ABSTRACT

A DPTSS fiber optic cable includes an optical fiber sheathing cylindrical metal tube accommodating a pressure sensor optical fiber and having a plurality of through holes formed therein; and pressure blocking sections formed at intervals in the axial direction of the cable.

7 Claims, 12 Drawing Sheets

(51) Int. Cl.
*G01K 11/32* (2006.01)
*G01L 1/24* (2006.01)
*G01L 11/02* (2006.01)
*G02B 6/44* (2006.01)

(52) U.S. Cl.
CPC ......... *G01D 5/35374* (2013.01); *G01K 11/32* (2013.01); *G01L 1/24* (2013.01); *G01L 11/02* (2013.01); *G02B 6/4429* (2013.01); *G01K 2011/322* (2013.01)

(58) Field of Classification Search
CPC G02B 6/3879; G02B 6/3893; G02B 6/02342; G02B 6/02395; G02B 6/4433; G02B 6/022; G02B 6/4429; G01D 5/35361; G01D 5/35364; G01D 11/245; G01D 5/35303; G01D 5/35374; G01K 11/32; G01K 2011/322; G01L 1/242; G01L 11/02; G01L 11/025; G01L 1/24; G01B 11/16
See application file for complete search history.

(56) References Cited

U.S. PATENT DOCUMENTS

| | | | |
|---|---|---|---|
| 9,244,239 | B2 | 1/2016 | Herbst |
| 2012/0111104 | A1* | 5/2012 | Taverner ................ G01H 9/004 73/152.16 |
| 2014/0056553 | A1 | 2/2014 | Villiger et al. |
| 2015/0211900 | A1* | 7/2015 | Xue ...................... G01L 1/1242 385/12 |
| 2015/0268433 | A1* | 9/2015 | Stratton ............... G02B 6/4416 385/101 |
| 2015/0285626 | A1 | 10/2015 | Yamauchi et al. |
| 2016/0116308 | A1 | 4/2016 | Xue et al. |

OTHER PUBLICATIONS

Written Opinion (PCT/ISA/237) dated Jul. 19, 2016, by the Japan Patent Office as the International Searching Authority for International Application No. PCT/JP2016/066989.

\* cited by examiner

| SECTION | 1 | 2 | 3 | 4 | 5 |
|---|---|---|---|---|---|
| SENSITIVITY [GHz/°C] | -2.68 | -1.44 | -1.19 | -1.14 | -2.64 |

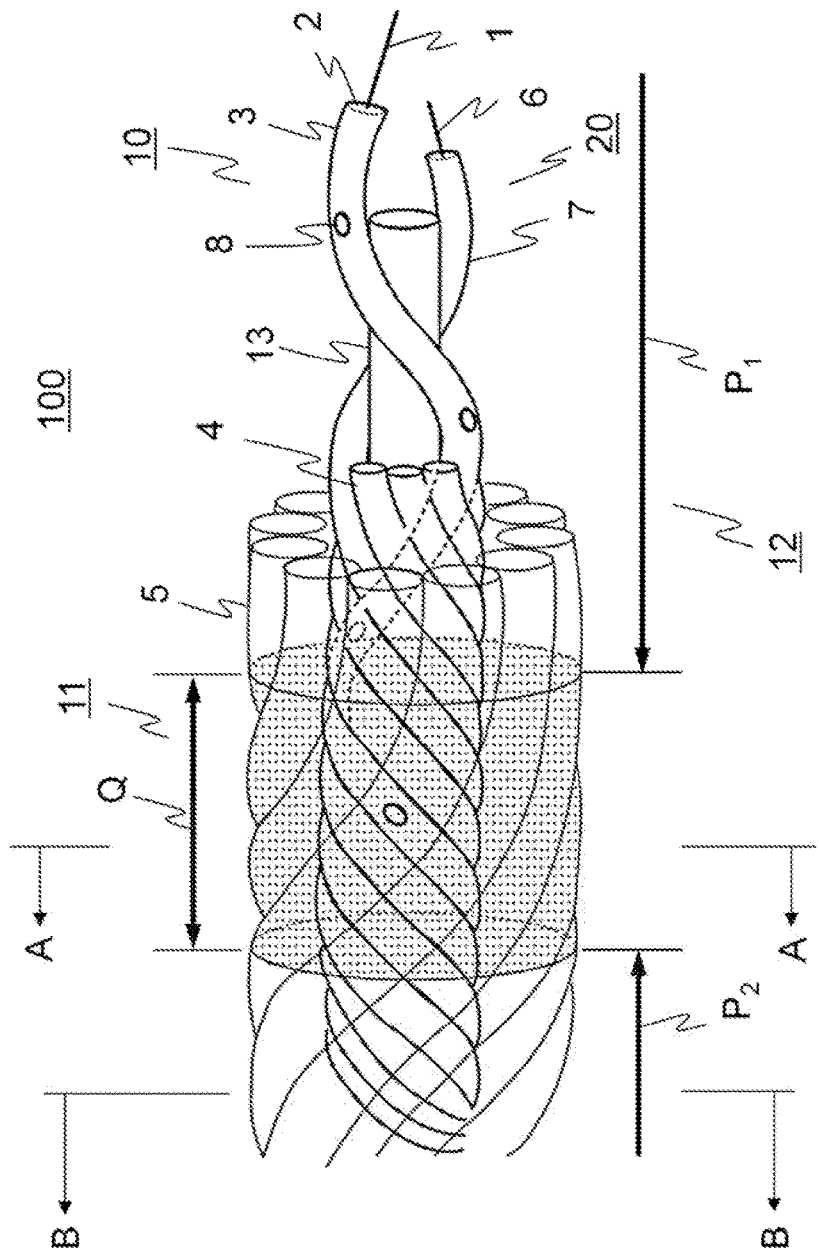

FIBER OPTIC CABLE FOR MEASURING PRESSURE, TEMPERATURE, AND STRAIN DISTRIBUTIONS

TECHNICAL FIELD

The present invention relates to a fiber optic cable having an optical fiber sheathing metal tube that is an improvement of a conventional fiber optic cable for measuring physical quantities, i.e., distributions such as of temperature and strain of a measurement target, and more particularly to a fiber optic cable that allows measurement such as of a pressure distribution and a strain distribution of the measurement target with higher accuracy than ever before, without using a fiber optic cable having a predetermined clearance space formed by means of a water-dissolvable coat or the like between the sensor optical fiber sheathing metal tube and its multilayer armored wires.

BACKGROUND ART

A fiber in metal tube (FIMT), which is an optical fiber sheathing metal tube, has been conventionally used in a variety of fields including a radiation thermometer because having advantages such as in that it can sheathe a plurality of optical fiber elements and exhibits a good sealing performance against water or hydrogen gas, and has a necessary mechanical strength such as tensile strength without reinforcement, and further because having capability of a temperature sensor and being able to measure a long-distance continuous temperature distribution along the optical fiber due to the fact that the optical fiber in the FIMT is subject to no force by pressure.

As an example of the fiber optic cable using such an FIMT as described above, there is disclosed a fiber optic cable that is made up of a central copper conductor; an inner sheath made of low density polyethylene and cylindrically surrounding the conductor; a first layer formed of pluralities of steel wires and FIMTs using a stainless steel tube of the same diameter, and wound helically about the inner layer; a second layer of a plurality of steel wires wound around the first layer helically in the direction opposite to the first layer; and an outer layer formed of medium density polyethylene and surrounding the second layer (see, for example, Patent Document 1).

Also, there is recently proposed a fiber optic cable as another example of using an FIMT. The fiber optic cable is made up of a first optical fiber arranged at the center and directly exposed to the outside environment to measure a pressure distribution along the axial (longitudinal) direction of the optical fiber cable, not only a temperature distribution; a first layer formed of a plurality of metal wires and a stainless steel tube accommodating a second optical fiber, and surrounding the first optical fiber; and a second layer formed of a plurality of metal wires and surrounding the first layer, wherein at least one of the plurality of metal wires in the first layer and at least one of the plurality of metal wires in the second layer have their outer diameter reduced at intervals in the longitudinal direction, for the first optical fiber to be exposed to the pressure from oil or gas (see, for example, Patent Document 2).

There is further disclosed a fiber optic cable used in a distributed fiber optic system for measuring distributions of temperature, pressure, and strain. The fiber optic cable is formed to have a constant clearance space between cylindrical shaped multilayer armored wirers formed of a plurality of steel wires and a sensor optical fiber sheathing metal tube, to further improve the accuracy in measuring strain of a measurement target with the sensor optical fiber, wherein in order to form the constant clearance space, the clearance space between the sensor optical fiber sheathing metal tube and the multilayer armored wirers are filled with a water-dissolvable resin or an oil-dissolvable resin in an early step of the manufacturing the fiber optic cable, and the water-dissolvable resin coat or the oil-dissolvable resin coat is removed by immersing the fiber optic cable in water or oil in a later step thereof, and then an epoxy resin or the like is injected into the fiber optic cable at appropriate intervals along the axial (longitudinal) direction thereof, to fix the sensor optical fiber sheathing metal tube and the multilayer armored wirers to each other (see, for example, Patent Document 3).

PRIOR ART DOCUMENT

Patent Documents

Patent Document 1; U.S. Pat. No. 4,971,420 B2
Patent Document 2: U.S. Pat. No. 9,244,239 B2
Patent Document 3: WO2014/181617 A1

SUMMARY OF THE INVENTION

Problem that the Invention is to Solve

A measurement of distributions of pressure, temperature, and strain using a distributed pressure, temperature, and strain system (DPTSS) has been implemented hitherto by respectively providing at least one optical fiber (hereinafter referred to as a T-fiber) that is subjected to no pressure and at least one optical fiber (hereinafter referred to as a P-fiber) that is subjected to pressure, as disclosed in Patent Document 2. An optical fiber sheathing metal tube (also referred to as "fiber in metal tube; and hereinafter abbreviated as "FIMT") is employed for the T-fiber subjected to no pressure. In an actual measurement of pressure and other quantities, however, the P-fiber for measuring pressure is subjected to a pressure and a strain of the cable at the same time; hence, the signals of both pressure and strain need to be separated. Moreover, the P-fiber needs a pulling out work in the termination process of the fiber optic cable. This also causes a problem of taking a lot of effort, for example, a possible tangle of the P-fiber.

The conventional FIMT ordinarily exhibits good seal performance. If even one pinhole (very small hole) exists in the metal sheath tube, however, a pressure blocking function is lost and this also causes a problem of making it impossible to perform a high accurate pressure measurement. That is, if a pinhole exists, a measurement target fluid penetrates inside the FIMT through the pinhole and no pressures difference is established between the inside and the outside of the FIMT. This causes a problem of making it impossible to perform the pressure measurement. However, if the influence of the pinhole can be limited locally, the many other measurement points are available, thus eliminating hindrance to the actual pressure distribution measurement.

Moreover, if the fiber optic cable has a structure such that the external pressure propagates in the axial (longitudinal) direction thereof, the pressure distribution is influenced in the longitudinal direction. Since this causes a problem in measuring the longitudinal pressure distribution, the longitudinal pressure propagation needs to be interrupted as much as possible. Furthermore, it is recently found that a problem explained below may possibly be caused if the fiber optic cable is manufactured using the water-dissolvable resin coat disclosed in Patent Document 3. The problem is explained in detail below with reference to the drawings.

FIG. 1 shows a result of measuring a strain produced in an optical fiber with the fiber optic cable fabricated using the water-dissolvable resin coat disclosed in Patent Document 3 by mean of pulse-prepump Brillouin optical time domain analysis (PPP-BOTDA). Here, in order to measure a residual strain after the fiber optic cable is manufactured, center frequencies of Brillouin scattering are measured in the axial direction using the fiber optic cable with no force. In the figure, the horizontal axis is the distance (in the unit of m) from a reference position of the fiber optic cable, and the vertical axis is the center frequency (in the unit of GHz). It should be noted that employing the PPP-BOTDA is due to the fact that it is known as having capability of obtaining a high spatial resolution.

In the fiber optic cable used in the measurement, an optical fiber sheathing metal tube and the armored wires are fixed to each other at intervals of about one meter. It seems reflection from this fixation that a similar sawtooth-like regular change of the Brillouin scattering center frequency is observed in each of all measurement sections. It is firstly found from the measurement result that in all sections of about one meter interval, the maximum values of the measured center frequencies of the Brillouin scattering are different from each other and the minimum values thereof are also different from each other. However, a problem is not the fact that these values are different but is rather the fact that the measured values, although they should essentially have a constant value, show the sawtooth-like change in all section of one meter interval. One of the reasons for this is considered that the water-dissolvable resin coat in the fiber optic cable is not completely dissolved and remains in the fiber optic cable. In addition, the solid squares in the graph indicate measurement points sampled by the measurement instrument.

Next, FIG. 2 shows a result of measuring frequency shifts of Rayleigh scattering using the P-fiber with a residual strain beforehand imposed therein. The measurement was performed with the same fiber optic cable shown in FIG. 1 using tunable wavelength coherent optical time domain reflectometry (TW-COTDR) at positions different from those shown in FIG. 1 under different temperature conditions (40° C. to 20° C.). In this figure, the horizontal axis is distance (in the unit of m) from a reference position of the fiber optic cable, and the vertical axis is the Rayleigh frequency shift (in the unit of GHz).

Since also in FIG. 2, the optical fiber sheathing metal tube and the armored wires are fixed to each other at the intervals of about one meter as described in the explanation FIG. 1, the Rayleigh frequency shifts in respective sections (for example, the section of 28 m to 29 m distances and the section of 29 m to 30 m distances) show independent changes under the different temperature conditions.

In order to quantitatively evaluate the changes of Rayleigh scattering shifts, the changes of Rayleigh scattering shifts (the temperature sensitivities of the optical fiber) measured in each sections under the respective temperature conditions are plotted on the graph in FIG. 3A. It may be said that the Rayleigh frequency shift changes (hereinafter, referred to "temperature sensitivity coefficient") in the sections other than the sections 2 show substantially constant values for the temperature change from 20° C. to 40° C. However, the temperature sensitivity coefficients in the sections 2 to 4 are quite different from those in the sections 1 and 5. Hence, the difference is specifically represented in FIG. 3B by numerical values. Each value in FIG. 3B indicates the amount of Rayleigh frequency shift change (GHz) when the temperature changes by 1° C.

The sensitivity coefficient to temperature is further explained below. It is known that the Rayleigh frequency shift change $\Delta v_R$ to temperature change is given by the following expression (see, for example, Patent Document 3):

$$\Delta v_R = C_{22} \cdot \Delta T \pm K \cdot \alpha \cdot C_{21} \cdot \Delta T$$

where $C_{22}$ and $C_{21}$ are coefficients representing the sensitivity characteristics of the optical fiber, i.e., constants indicating temperature sensitivity and strain sensitivity to the Rayleigh scattering, respectively, K is a constant taking a value between 0 and 1, $\alpha$ is a linear expansion coefficient, and $\Delta T$ is the amount of temperature change. It is considered from the above expression that in the case of K=0, the measurement values reflect the sensitivity of the optical fiber element, and in the case of K=1, the measurement values reflect the linear expansion coefficient $\alpha$ of the wires.

In this measurement, the wires used are the same and the different results are obtained depending on the measurement sections as shown in FIGS. 2 and 3; hence, it is considered that the value of K is considered to be nearly zero. That is, the result shown in FIG. 2 that the amount of Rayleigh frequency shift change in each section differs from each other for the same temperature change (see FIG. 3B) is considered to be due to the fact that the marginal length of the optical fiber in each section before the measurement is different from each other. In addition, in FIG. 2, the steep changes of the Rayleigh scattering frequency shift at both boundaries of each section suggests that strength of the fixation between the optical fiber sheathing metal tube and the armored wires may possibly be uncontrolled at the time of manufacturing.

The present invention is made in light of the above-described problems and aimed at providing a fiber optic cable (hereinafter, also referred to as DPTSS cable) for measuring distributions of pressure, temperature, and strain that includes an FIMT accommodating a pressure sensor optical fiber in its cylindrical metal sheath tube with a plurality of small holes; and a plurality of steel wires with no special shape, and is easy to manufacture and capable of measuring with high accuracy a distribution such as of pressure of a measurement target.

Means for Solving the Problem

A fiber optic cable for measuring pressure, temperature, and strain distributions according to the present invention includes an inner layer formed of an optical fiber sheathing metal tube and metal wires supporting the optical fiber sheathing metal tube, the optical fiber sheathing metal tube and the metal wires being mixedly arranged coaxially about an center axis of the fiber optic cable; and an outer layer formed of a plurality of metal wires arranged coaxially with the inner layer to surround the inner layer, wherein the inner layer and the outer layer are formed into a multilayer strand structure, and the strand structure has pressure blocking sections formed at intervals in an axial direction of fiber optic cable, to block an influence of a pressure propagating in the axial direction of fiber optic cable; and wherein the optical fiber sheathing metal tube accommodates a pressure sensor optical fiber for measuring a pressure distribution of a measurement target on the basis of frequency changes of Brillouin scattering and Rayleigh scattering of pulse laser light entered into the sensor optical fiber, and is formed to have through holes.

Advantage Effect of the Invention

According to the present invention, an optical fiber sheathing cylindrical metal tube has holes formed therein, although conventional optical fiber sheathing metal tubes have been presupposed to have no holes, for an optical fiber accommodated therein to receive a force by pressure of a measurement target, thereby allowing a pressure distribution of the measurement target to be measured even using the optical fiber sheathing metal tube with the holes. Furthermore, the clearance between the sensor optical fiber and the cylindrical metal sheath tube can be made more uniform, thereby being able to obtain a high measurement accuracy that the conventional fiber optic cable for measuring distributions of pressure, temperature, and strain cannot achieve.

BRIEF DESCRIPTION OF THE DRAWINGS

FIGS. 4A, 4B, and 4C are views for explaining an example of a basic structure of a DPTSS cable according to Embodiment 1 of the present invention;

EMBODIMENTS FOR CARRYING OUT THE INVENTION

Embodiment 1

Figure 1:
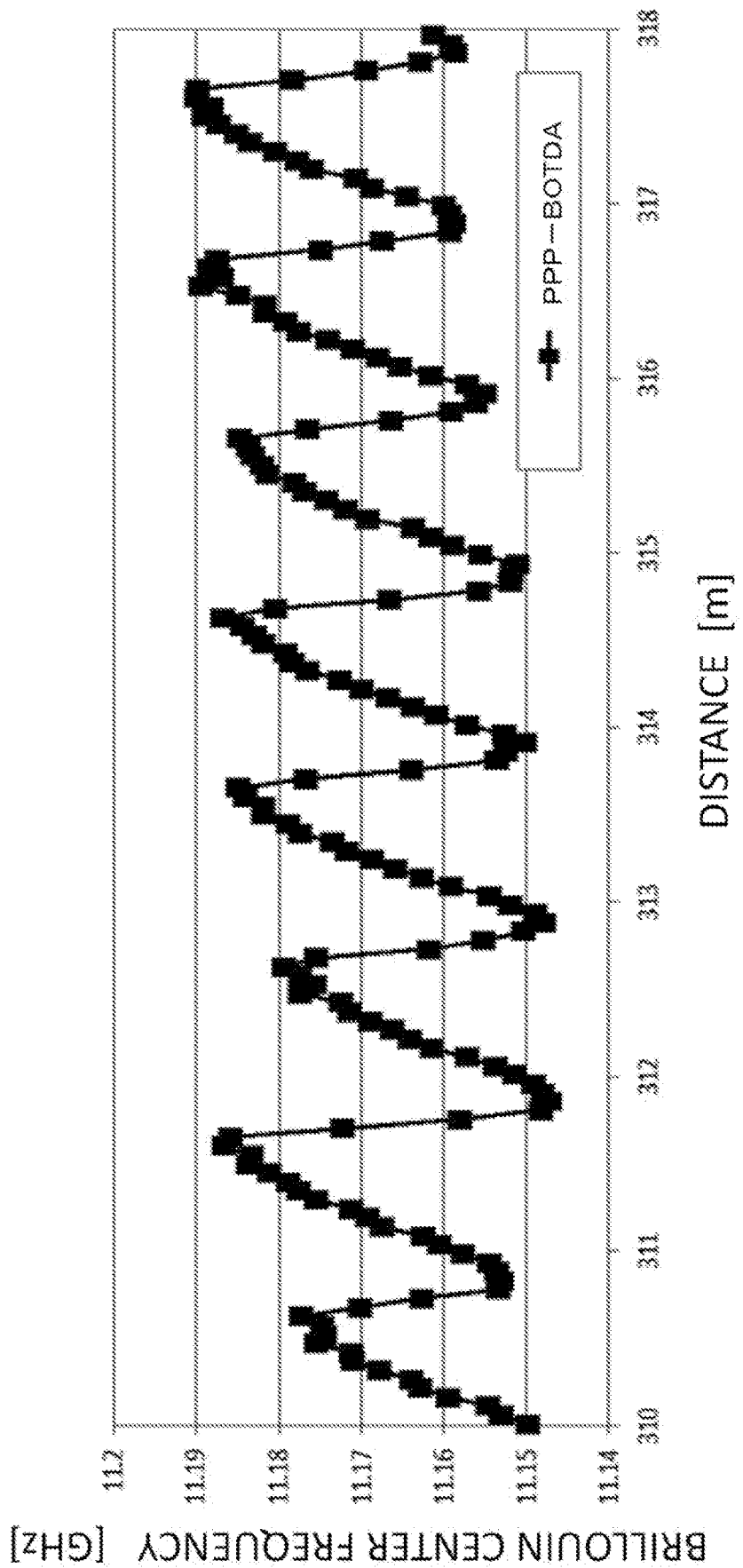
FIG. 1 is a graph presenting an example of a problem in a conventional DPTSS cable.

Embodiment 1 of the present invention will be described below with reference to the drawings. First of all, an example of a basic structure of a DPTSS cable according to Embodiment 1 of the present invention is described with reference to FIGS. 4A, 4B and 4C. FIGS. 4A, 4B and 4C are views for explaining the basic structure of the DPTSS cable 100, which is one example of a fiber optic cable according to Embodiment 1 of the present invention.

Referring to FIGS. 4A, 4B and 4C, the DPTSS cable 100 has two kinds of main sections formed separately in the axial direction of the cable. Specifically, the DPTSS cable has, as shown in FIG. 4A, pressure blocking sections 11 (sections incapable of sensing no pressure) indicated by the arrow Q and pressure sensing sections 12 indicated by the arrows $P_1$ and $P_2$ next to the pressure blocking sections 11. And, the DPTSS cable includes sensor optical fiber sheathing cylindrical metal tubes, which are constituents of the DPTSS cable, arranged throughout the two kinds of the main pressure blocking sections 11 and the pressure sensing sections 12. Specifically, arranged are a new-structure FIMT 10 proposed here that is formed of a cylindrical metal sheath tube 3 accommodating therein a P-fiber 1, an optical fiber for measuring pressure, and a conventional FIMT 20 that is formed of a cylindrical metal sheath tube 7 accommodating therein a T-fiber 6, an optical fiber for measuring temperature. The FIMT 10 of cylindrical metal sheath tube 3 has holes 8 for sensing pressures at appropriate intervals formed throughout the tube (see FIG. 4A). In each pressure blocking section 11, a clearance space between the center core, an inner layer arranged around the center core, and the outer layer arranged around the inner layer is filled with interlayer infill 14 as shown in FIG. 4B, to form a pressure isolator block (PIB) structure for blocking longitudinal propagation of pressure. In each pressure sensing section 12, in contrast, the clearance space between the center core, the inner layer arranged immediately around the center core, and the outer layer arranged around the inner layer is filled with no interlayer infill as shown in FIG. 4C, to form a void space. That is, the interlayer infill 14 is a constituent indispensable for the pressure blocking sections 11, but may be unnecessary for the pressure sensing sections 12 (in the case of no interlayer infill, the clearance space in the sections is empty). In addition, no forming of the holes 8 causes no problem for a portion of the FIMT 10 of the cable installed at a shallow location near the ground.

The DPTSS cable thus structured to have the pressure blocking sections 11 filled with the interlayer infill 14 interrupts influence of external pressure propagating in the longitudinal direction on the pressure sensing sections 12 next to the pressure blocking sections 11. Put differently, the pressure sensing sections 12 each are isolated from the other pressure sensing sections by adjacent two of the pressure blocking sections 11 formed in the axial direction. The structure is described in further detail below.

Figure 5:
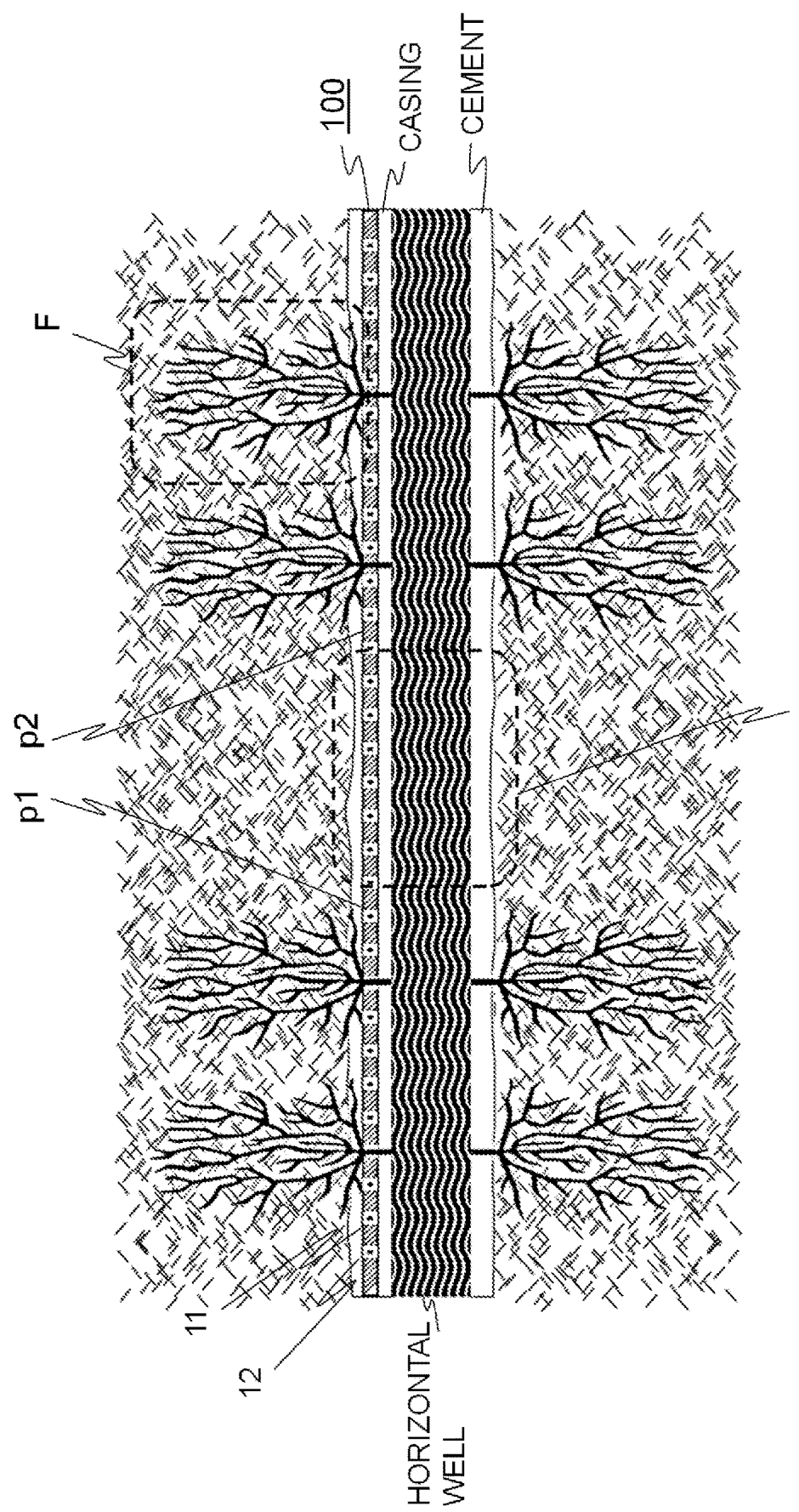
FIG. 5 is a diagram for explaining an operation of the DPTSS cable according to Embodiment 1 of the present invention when the cable is applied to an actual measurement site.

FIG. 5 is a diagram showing an example of using the DPTSS cable having the new-structure FIMT 10 in an actual measurement site. To be more specific, a pressure distribution along a measurement target of a horizontal well in an actual site is measured with the P-fiber in the DPTSS cable 100 according to Embodiment 1 of the present invention.

In this measurement, the DPTSS cable 100 having the FIMT 10 is enclosed with a casing and installed along the horizontal well, as shown in the figure. Cement is provided across the horizontal well, i.e., on the side opposite to the DPTSS cable 100. A measurement fluid flows into the horizontal well through a plurality of clefts, which is indicated by the symbol "F" in the figure, created in bedrock on both cement side and casing side where the DPTSS cable 100 is installed. In this installation, the pressure distribution in the fluid flow direction along the horizontal well is measured with the P-fiber in the FIMT 10. In this measurement, the pressure blocking sections 11 and the pressure sensing sections 12, which are major constituents of the DPTSS cable, are formed one after another in the fluid flow direction along the horizontal well, as shown in the figure.

And the portion enclosed by the symbol "S" indicates a pressure isolated region. That is, by providing the pressure isolating region S having the pressure isolator block structure formed by the pressure blocking sections 11 and the cement, the pressure p1 in the left side of the pressure isolating region S does not affect the pressure p2 in the right side thereof. Note that this is independent of the number of pressure blocking sections 11 (one or more also brings about the same isolating effect).

Figure 6:
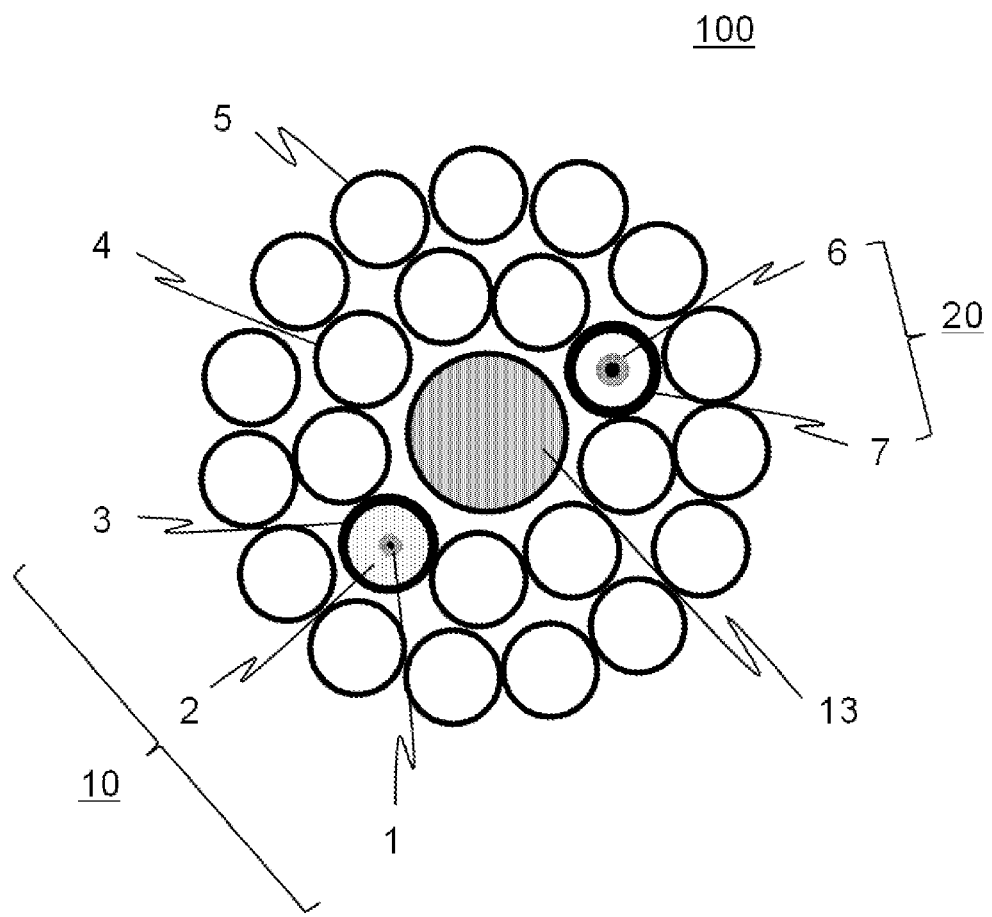
FIG. 6 is a view showing an example of a cross-sectional configuration of a pressure sensing section of the DPTSS cable according to Embodiment 1 of the present invention.

In order to describe in further detail the pressure sensing section of the DPTSS cable 100 shown in FIGS. 4A, 4B, and 4C, a cross-sectional view taken perpendicularly to the axis of the cable is shown in FIG. 6. FIG. 6 is the cross-sectional view of the DPTSS cable 100 taken in the orthogonal direction of its axis and not at a position of the holes 8 formed in the axial (longitudinal) direction of the new-structure FIMT 10 proposed here. As shown in the figure, a cylindrical center wiring tube 13 is arranged in the center that has an outer diameter larger than those of other wires used in the DPTSS cable 100 and mixedly accommodates, other than the optical fibers, various kinds of lines (not shown), such as for example a power line, a data transmission line. A first layer and a second layer including a plurality of wires and the cylindrical metal tubes are coaxially arranged around the center wiring tube 13. To be more specific, the first layer is arranged as the inner layer that is formed of the FIMT 10 accommodating the P-fiber 1 at its center; the conventional-type FIMT 20 accommodating the T-fiber 6 at its center; and a plurality of metal (for example, steel) wires 4, each surrounding and helically winding the center wiring tube 13 at an immediately outside position of substantially the same circumferential radius of the center wiring tube 13. The second layer is further arranged as the outer layer that is formed of a plurality of metal (for example, steel) wires 5 each surrounding and helically winding the first layer at an outside position of substantially the same circumferential radius of the first layer. The inner layer and the outer layer both are formed into a so-called strand structure. In addition, the pluralities of metal wires have no special shape as disclosed in Patent Document 2.

Note that forming the center wiring tube 13 to have an outer diameter lager than those of the wires and the other tubes arranged thereoutside as shown in FIG. 6, brings a merit of increasing structural strength. Accordingly, it can be expected to bring about an effect of more increasing mechanical strength of the DPTSS cable 100 as a whole.

Next, the FIMT 10 used in the DPTSS cable 100 thus structured is described in further detail below with reference to FIG. 7A and FIG. 8. Note that in the following figures, detailed descriptions about the parts (constituent components) designated at the same reference numerals in FIGS. 4A to 6 are omitted for the sake of brevity.

Figure 7A:
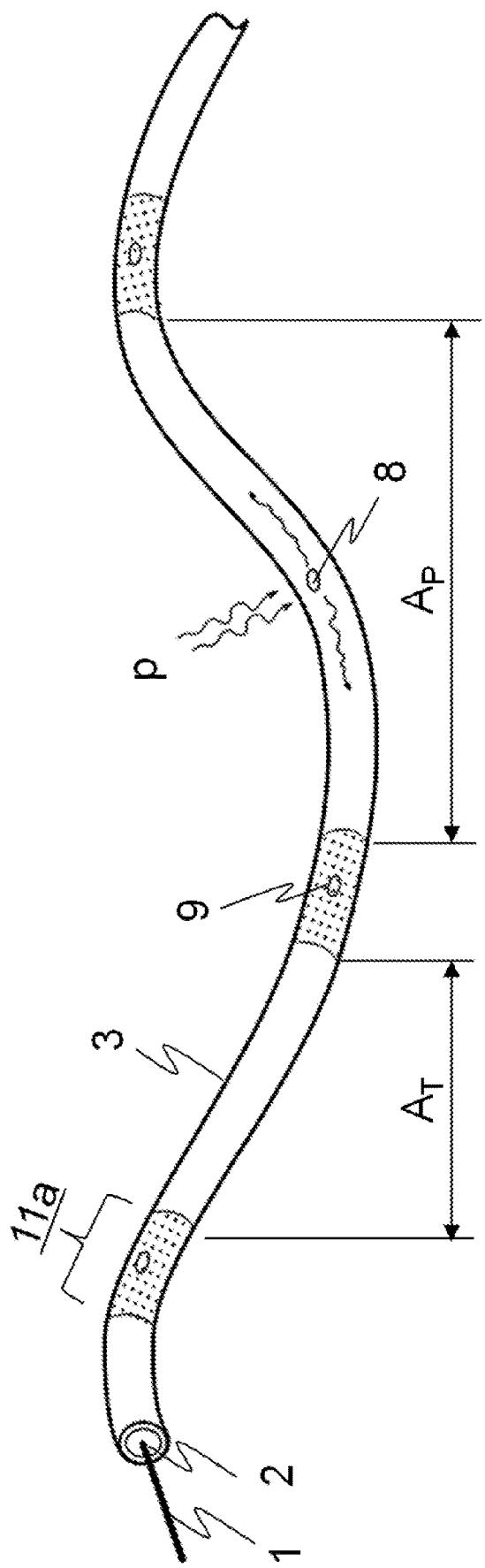
FIGS. 7A and 7B are views showing an example of detail structure of the FIMT used in DTPSS cable according to Embodiments 1 to 3.
Figure 7B:
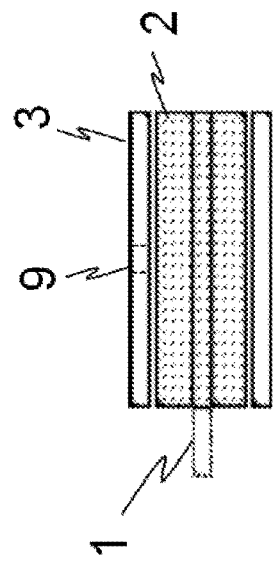

FIGS. 7A and 7B show example model views of the FIMT 10. FIG. 7A is a view for explaining a function of the FIMT 10; and FIG. 7B is an axial cross-sectional view of the pressure blocks having the PIB structure indicated by the reference numeral of "11a" in FIG. 7A. The PIB structure is described in detail in the later explanation of FIG. 7A and FIG. 7B.

Referring to FIGS. 7A and 7B, the P-fiber 1 is surrounded by and contact with the infill 2 made of resin or low-temperature solder (in some portions, the infill is in contact with the outer cylindrical metal tube 3). The outer cylindrical metal tube 3 has the plurality of through holes 8, which are indicated by the small circles, formed therein. The holes 8 can also be used as holes 9 for injecting the infill 2 (see FIG. 7A and FIG. 7B). In addition, the symbol "p" in the figure represents pressure of the measurement target.

In FIG. 7A, the pressure blocks 11a formed at appropriate portions in the axial direction of the FIMT 10 correspond to the pressure blocking sections 11 shown in FIG. 4A. The other sections in the axial direction correspond to the pressure sensing sections 12. Note that in the portions where the infill 2 is in contact with the cylindrical metal sheath tube 3, the P-fiber 1 is fixed to the cylindrical metal sheath tube 3.

Thus, the cylindrical metal sheath tube 3 in the portion serves as a sealing tube, and the portions for blocking the influence of external pressure are formed by filling up the clearance between the P-fiber 1 and the cylindrical metal sheath tube 3 with the infill 2, in other words, the portion is the fixed portions blocking inflow of fluid from the external into the internal and incapable of sensing pressure. Hereinafter, the structure of this portion is referred to as "PIB structure". It should be noted that the interval of the portions can be altered depending on the required measurement specification of the measurement target.

Referring back to FIG. 7A, in the section designated at the symbol "$A_P$" with the hole 8, the optical fiber in the FIMT 10 serves as the P-fiber, and in the section designated at the symbol "$A_T$" with no holes 8, on the other hand, the optical fiber in the FIMT 10 serves not as the P-fiber but, for example, T-fiber. Put differently, a section of the FIMT 10 between adjacent two of the pressure blocks 11a serves as having the P-fiber if at least one hole 8 exists in the section or serves as having the T-fiber if no holes 8 exist in the section. If each section throughout the entire length of the FIMT 10 has the hole 8 between adjacent two of the pressure blocks 11a, the whole of the FIMT 10 serves as having the P-fiber, and if each section throughout the entire length thereof has no hole 8 between adjacent two of the pressure blocks 11a, the whole of the FIMT 10 serves as having the T-fiber. It is noted that each portion where the pressure block 11a is formed is provided with a hole 9, as show in FIGS. 7A and 7B, for injection of the infill 2 from outside the cylindrical metal tube 3. The hole is used for fixing the P-fiber or the T-fiber to the metal tube.

Next, an effect of using in the DPTSS cable 100 the new structured FIMT 10 described above is described in detail with reference to FIG. 8.

Figure 8:
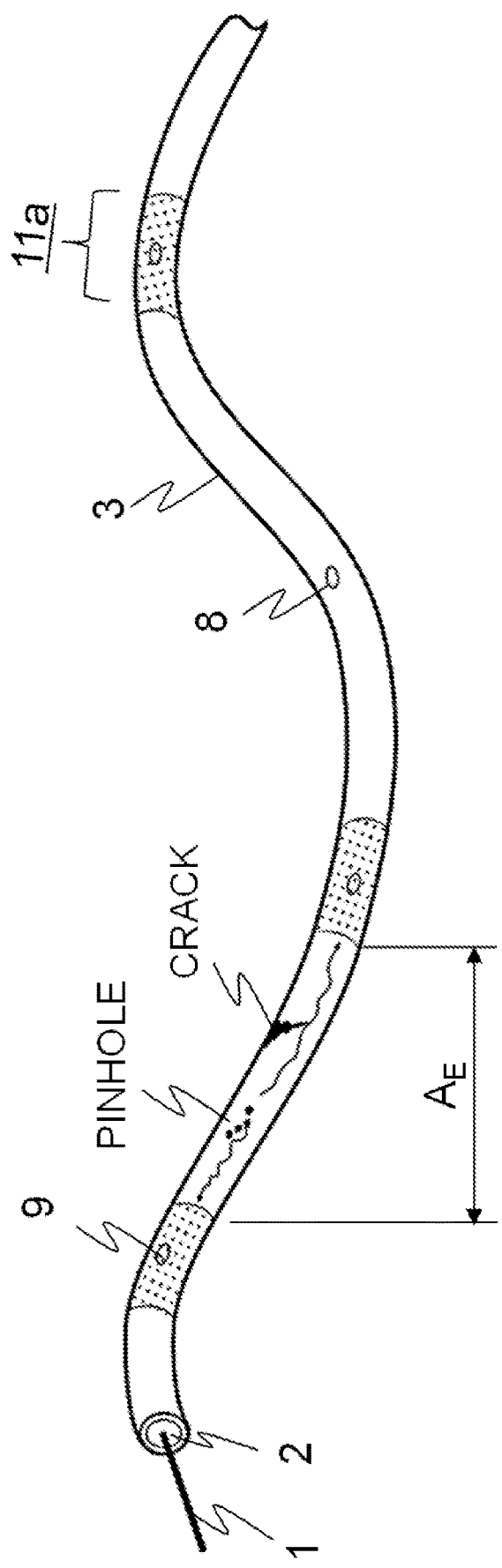
FIG. 8 is a view for explaining an effect of the FIMT used in the DPTSS cable according to Embodiments 1 to 3 of the present invention.

FIG. 8 is a view showing a case where a pinhole or a crack exists in a section $A_E$ between two of the pressure blocks 11a formed in the cylindrical metal tube 3 of FIMT 10. Even if a pinhole or a crack shown in the figure happens to exists in an FIMT of a DPTSS cable being used in an actual measurement site, the FIMT used in the DPTSS cable according to Embodiment 1 can limit an adverse effect due to such a pinhole or a crack to the section $A_E$ by the pressure blocks 11a formed both ends of the section $A_E$, so that such a pinhole or a crack does not affect the pressure distribution measurement in the sections other than the section $A_E$ in an actual measurement.

In addition, a gel can also be used as the infill for the portion indicated by reference numeral "2" shown in FIGS. 7 and 8. In this case, the gel can also be injected as the infill without being in contact with the cylindrical metal sheath tube 3.

The through hole 8 formed in the section indicated by the symbol "$A_P$" allows for measuring a pressure of the measurement target with the P-fiber 1 directly (for the case of the portion indicated by the reference numeral "2" being empty) or via the infill of the gel. The existence of holes 8 eliminates the need to consider the influence of the pressure of the measurement target by separating the influence into a strain of the cylindrical metal sheath tube itself of the FIMT 10 and a strain of the P-fiber 1, that is, only a strain produced in the P-fiber 1 may be considered.

Furthermore, in order to enable the measurement to be performed with a distance resolution required for the measurement target, the pressure blocks 11a are formed at positions on the basis of the distance resolution, i.e., the measurement sections of the FIMT 10 are set on the basis thereof and at least one hole 8 needs to be formed for each of the set measurement sections. Forming the holes 8 thus formed allows pressure of the measurement target fluid to be measured.

Figure 2:
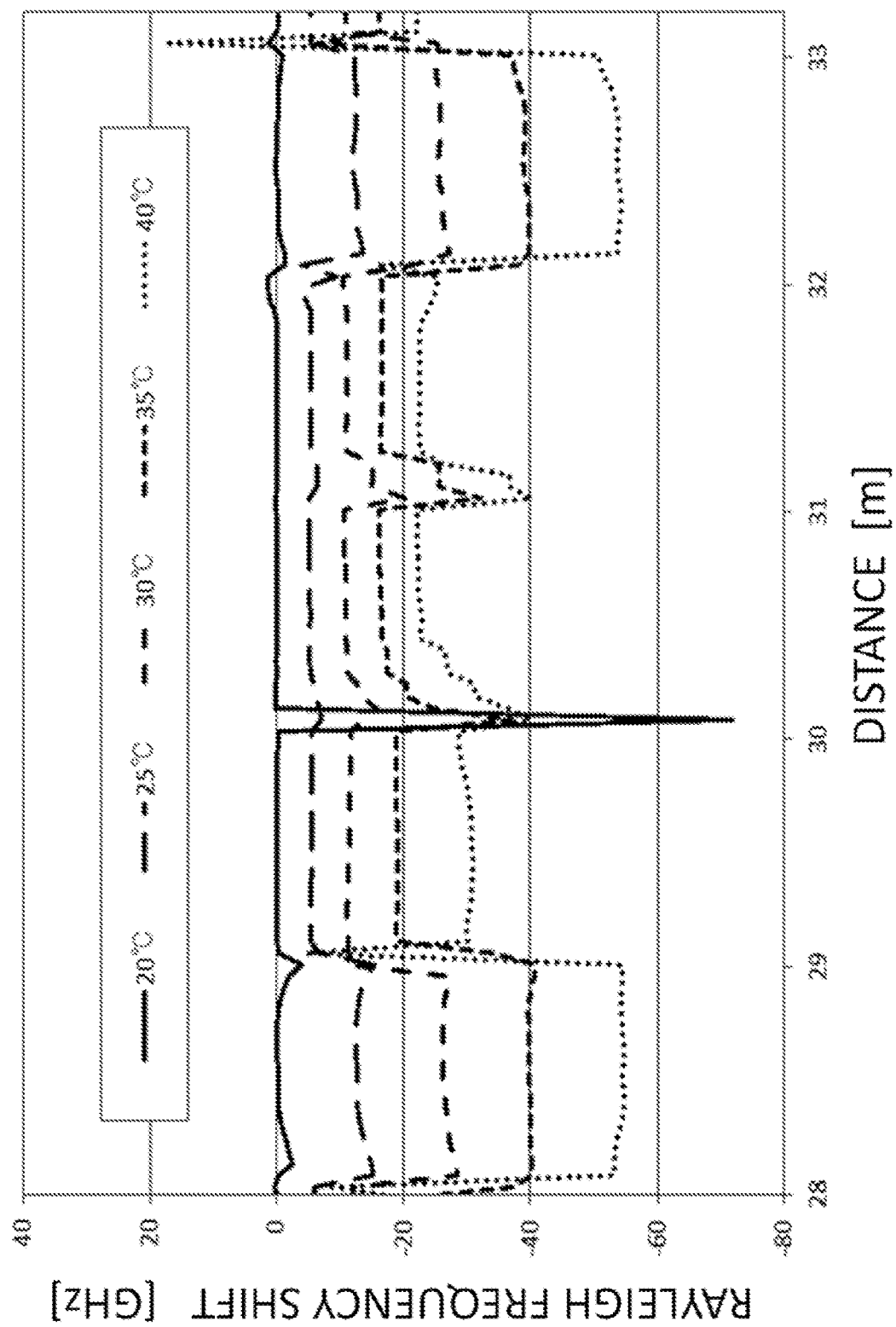
FIG. 2 is a graph presenting another example of the problem in the conventional DPTSS cable.
Figures 3A, 3B:
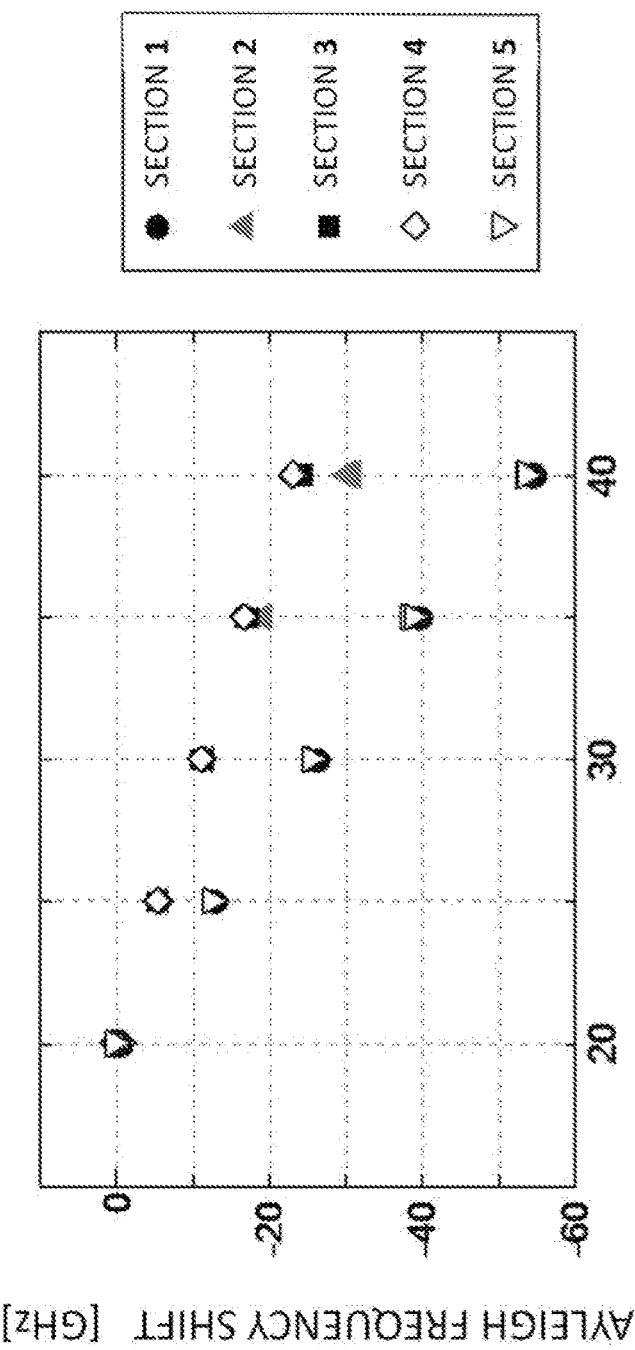
FIGS. 3A and 3B are a graph and a table showing a temperature sensitivity of the conventional DPTSS cable determined from FIG. 2.

Using the thus-formed FIMT 10 to sense pressure allows a continuous pressure distribution to be measured along the entire sections in the axial direction of the FIMT 10 because the FIMT 10 has no points for fixing the P-fiber 1 directly to the cylindrical metal tube, thus, eliminating the problem, which is pointed out in the explanation of FIG. 2, FIG. 3A and FIG. 3B, caused by existence of the fixed points.

That is, using the DPTSS cable including the FIMT 10 described above can overcome the problems described in the previous section of "Problem that the Invention is to Solve".

In order to verify the effect of the fiber optic cable according to Embodiment 1, a Brillouin scattering frequency is actually measured using the actually usable DPTSS cable having the above-described FIMT 10 and the FIMT 20 accommodating the T-fiber (temperature-sensor optical fiber) arranged at the positions shown in the basic structure of FIG. 4A. The measurement is described with reference to the figure.

Figure 9:
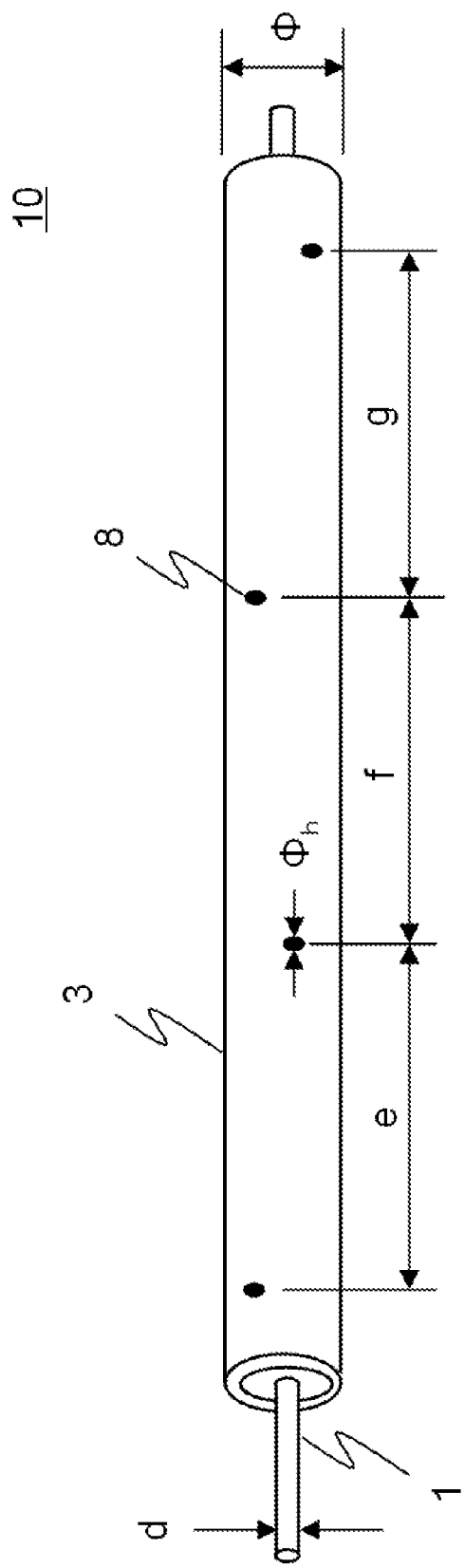
FIG. 9 is a diagram for explaining the specifications of the FIMT used in the measurement.

FIG. 9 is a diagram for explaining the specifications of the FIMT 10 having the PIB structure used in the measurement. In this figure, "$\Phi$" represents the outer diameter of the FIMT 10 and is 1 mm, "d" represents the diameter of the optical fiber and is 0.25 to 0.4 mm, and "$\Phi_h$" represents the diameter of the holes 8 and is 0.15 mm. The interval e is the minimum interval of about one meter among the intervals between neighboring holes 8 of the plurality of holes 8 formed in the FIMT 10. In addition, the intervals f and g represent those between the other neighboring holes and are more than the interval e.

Setting the interval e shorter than the measurement resolution causes no problem in the measurement. Furthermore, setting the interval e sufficiently shorter than the length of section B, in which section no pressure is applied but the frequency of Brillouin scattering varies as described below, causes no errors in the measured pressure. In addition, a confirmatory experiment was performed in this measurement using a fiber optic cable having an entire length of more than 1 km (about 1.3 km).

A frequency measurement was performed for Brillouin scattering using the above-described fiber optic cable having the FIMT 10 shown in FIG. 9. The measurement results are described below with reference to FIG. 10.

Figure 10:
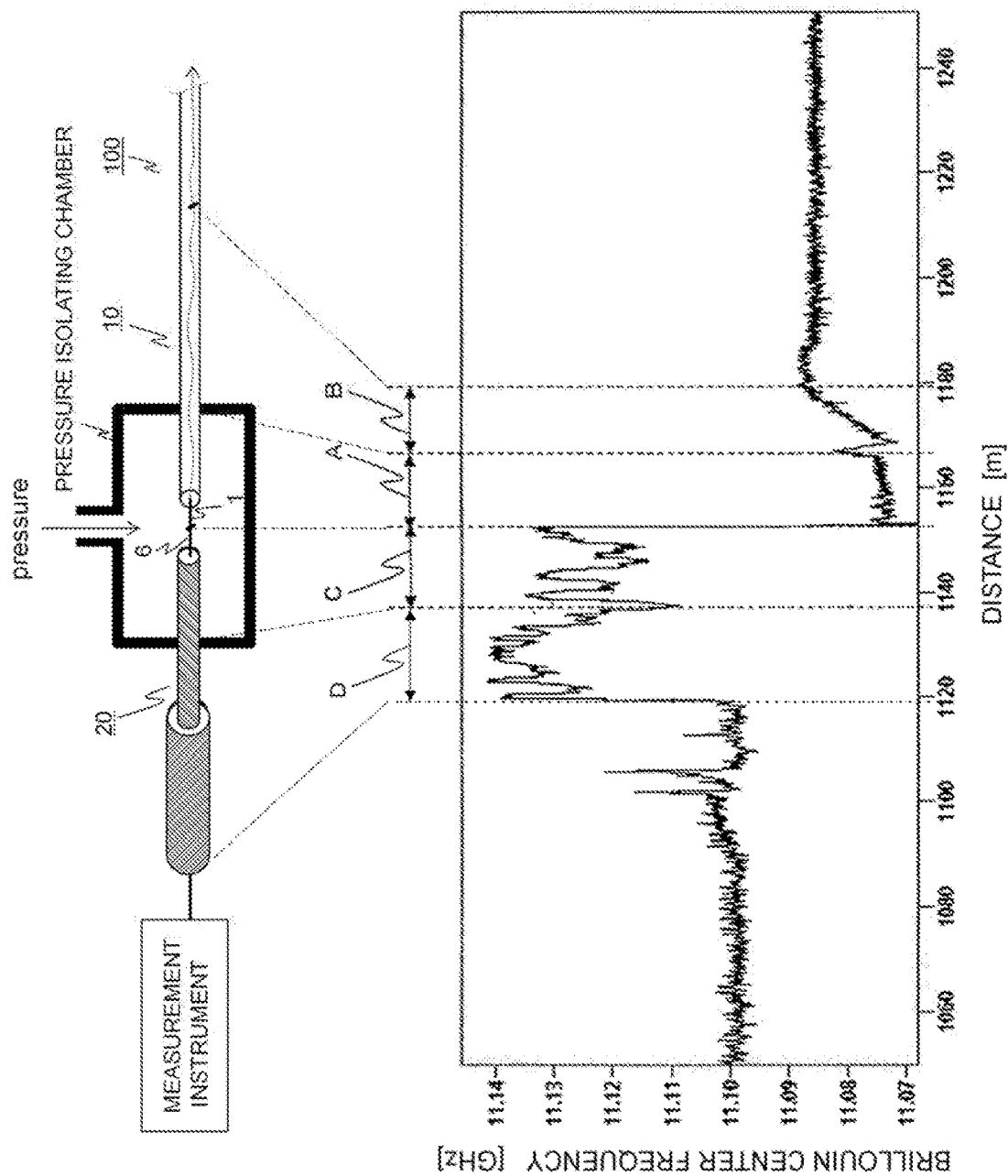
FIG. 10 are diagrams showing an example of a measurement result obtained by using the DPTSS cable according to Embodiment 1 of the present invention.

The measurement result is shown in the lower graph of FIG. 10, and the upper part thereof is a schematic diagram of a measurement system used, for showing the positional correspondence between the lower graph and the upper diagram. In the lower graph showing the measurement result, the horizontal axis represents a distance (in the unit of m) from a reference position, and the vertical axis, the center frequency (in the unit of GHz) of Brillouin scattering. Further, the symbols "A", "B" "C" "D" in the lower graph specifically show the respective corresponding measurement sections in the measurement system shown in the upper diagram. The section A (between the distances of 1,152 m and 1,165 m) and the section C (between the distance of 1,140 m and 1,152 m) are pressure-isolated from the other sections using a pressure isolating chamber. The data in the section C and the section D are measured using with a DPTSS cable with the conventional FIMT 20 having the T-fiber 6, and the data in the section C is measured in the pressure isolating chamber and the data in the section D is measured outside the pressure isolating chamber. Both measured data of the center frequency of Brillouin scattering vary significantly in these sections, and a pressure variation, which is described in the previous section of "Problem that the Invention is to Solve", is also seen in the data measured in the pressure isolating chamber (the data in the section C). This shows that the problem remains unresolved. The data in the section A and the section B, on the other hand, are measured using the DPTSS cable 100 with the proposed new-structure FIMT 10 having the P-fiber 1, and the data in the section A is measured in the pressure isolating chamber and the data in the section B is measured outside the pressure isolating chamber. While the data of the center frequency of Brillouin scattering measured in the section B, i.e., outside the pressure isolating chamber was not constant and had a variation, the data of the center frequency of Brillouin scattering measured in the section A, i.e., in the pressure isolating chamber showed substantially a constant value. In addition, the measurement was performed, with the fiber optic cable being installed to have at least one or more of the holes 8 in the section A.

From the above measurement result that the center frequency of Brillouin scattering in the section A showed a substantially constant value, the expected effect was confirmed. In addition, while the PIB structure is not formed in the section B (between the distances of 1,165 m and 1,180 m), the variation is considered to be due to influence of the pressure in the section A.

As described above, the DPTSS cable 100, which is the fiber optic cable proposed here, includes the FIMT 10 accommodating the P-fiber 1 therein and having the through holes 8 formed in the cylindrical metal sheath tube, whereby the clearance between the P-fiber 1 and the cylindrical metal sheath tube can be formed more uniform while keeping the merit a conventional FIMT has. This allows for overcoming the problem that the center frequency of Brillouin scattering is measured as having a variation, thus bringing about a remarkable effect of being able to measure a distribution such as a pressure distribution of a measurement target with high accuracy compared to a conventional fiber optic cable. It should be noted that the cylindrical metal sheath tubes described above need not necessarily to have a cylindrical shape. The same effect is brought about as far as they are metal tubes.

Embodiment 2

A DPTSS cable 200 according to Embodiment 2 of the present invention is described below with reference to FIG. 11. Note that in FIG. 11, the parts (constituent components) designated at the same reference numerals described before in the explanation of FIGS. 4 and 6 and that the DPTSS cable 200 has the strand structure as a whole are the same as with Embodiment 1; their detailed descriptions are omitted here for the sake of brevity.

Figure 11:
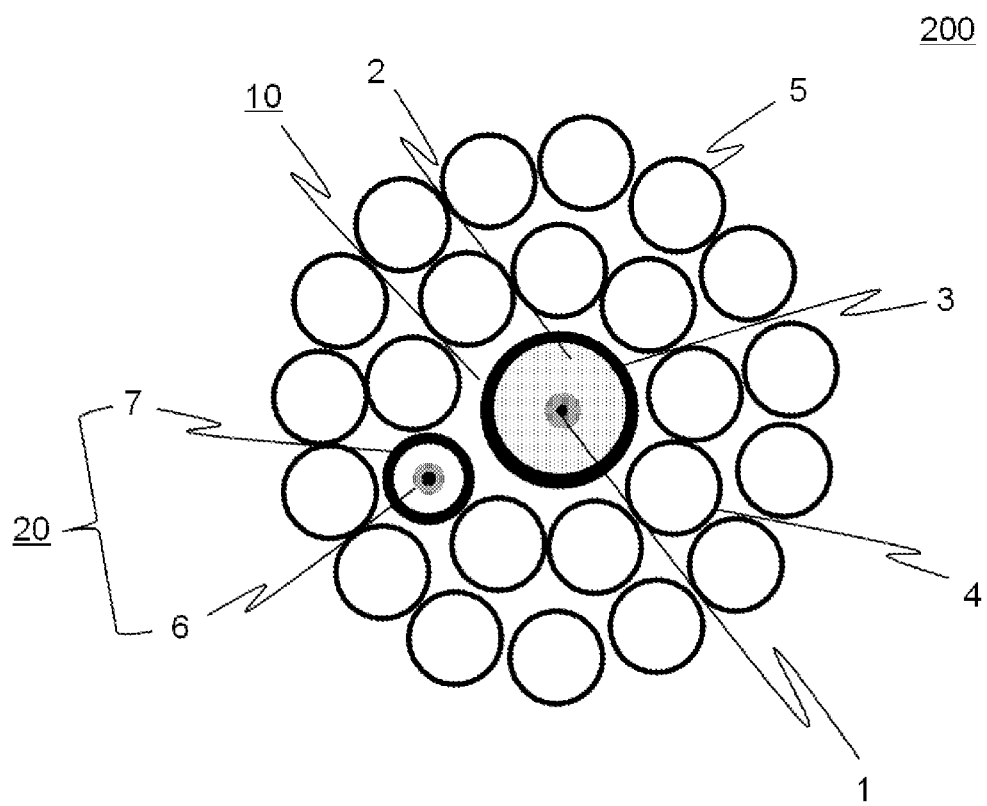
FIG. 11 is a view showing an example of a cross-sectional configuration of the pressure sensing section of a DPTSS cable according to Embodiment 2 of the present invention.

FIG. 11 is a cross-sectional view of the DPTSS cable 200 taken in the direction orthogonal to its axis and not at a position of the holes 8 formed in the axial (longitudinal) direction of the new-structure FIMT 10 proposed here. As shown in the figure, the FIMT 10 used in the DPTSS cable 200 is different from that used in the DPTSS cable 100 described in Embodiment 1 in that the new-structure FIMT 10 accommodating the P-fiber 1 is arranged not in the same inner layer as the FIMT 20 accommodating the T-fiber 6 is arranged but at the center portion of the cable and in that the FIMT 10 is formed larger in the outer diameter than the FIMT 20.

The DPTSS cable 200 thus formed is capable of protecting the P-fiber more firmly than the DPTSS cable 100 according to Embodiment 1, thus bringing about an effect of increasing the lifetime of the P-fiber and of enhancing the reliability of measurement data obtained, in comparison to using the DPTSS cable 100 of Embodiment 1.

Embodiment 3

A DPTSS cable 300 according to Embodiment 3 of the present invention is described below with reference to FIG. 12. Note that in FIG. 12, the parts (constituent components) designated at the same reference numerals described before in the explanation of FIGS. 4 to 6 and FIG. 11 and that the DPTSS cable 300 has a strand structure as a whole are the same as with Embodiment 1; hence, their detailed descriptions are omitted here for the sake of brevity.

Figure 12:
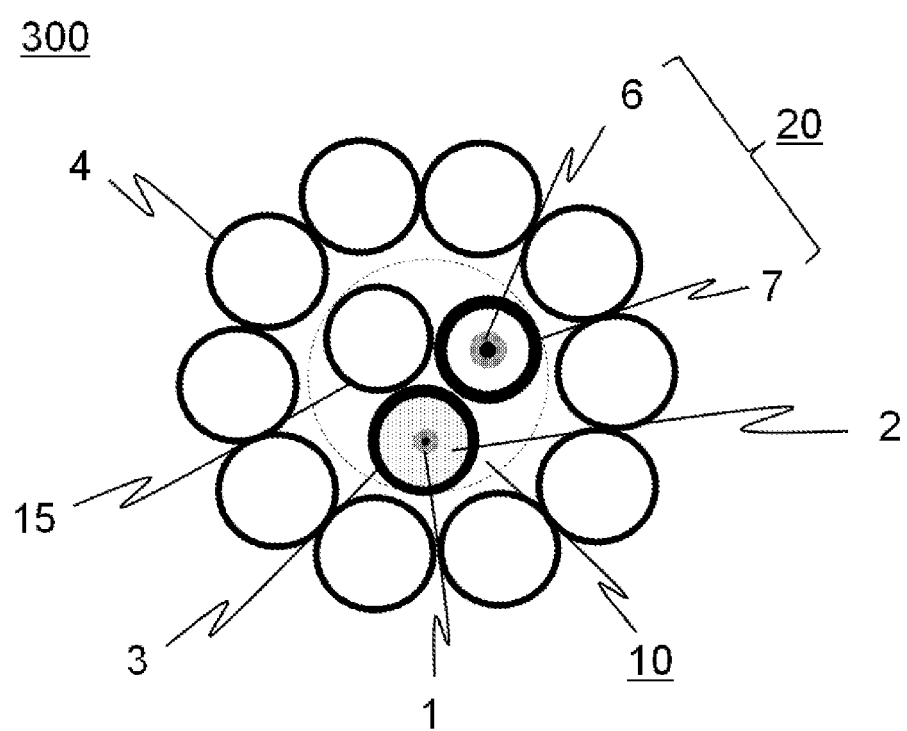
FIG. 12 is a view showing an example of a cross-sectional configuration of the pressure sensing section of a DPTSS cable according to Embodiment 3 of the present invention.

FIG. 12 is a cross-sectional view of the DPTSS cable 300 taken in the direction orthogonal to its axis and not at a position of the holes 8 formed in the axial (longitudinal) direction of the new-structure FIMT 10 proposed here. As shown in the figure, the DPTSS cable 300 is different from the DPTSS cable 100 described in Embodiment 1 in that no center wiring tube 13 having the large diameter is arranged at the center. Moreover, the arrangement of the FIMT 10 accommodating the P-fiber 1 is different from that of the FIMT 10 of the DPTSS cable 100 described in Embodiment 1. Only three kinds of tubes and wire: the FIMT 10; the FIMT 20 (having substantially the same diameter as the FIMT 10) accommodating the T-fiber 6; and a dummy wire 15 having substantially the same diameter as the FIMT 10, are arranged not outside the center wiring tube 13 but arranged in an inner layer, i.e., arranged as a first layer at the center portion where the center wiring tube 13 is positioned in Embodiment 1. In addition, a plurality of steel wires is arranged as an outer second layer to surround the first layer.

The DPTSS cable 300 thus formed has a simple structure compared to the DPTSS cable 100, the fiber optic cable according to Embodiment 1, thus bringing about an effect of facilitating the manufacture of the cable, in addition to the effect the DPTSS cable 100 has.

As described above, while the DPTSS cable having the new-structure FIMT proposed here that is the cylindrical metal sheath tube with holes formed therein brings about various effects, other effects can be expected, such as in that design flexibility is increased: for example, the P-fiber can be set not only in the center of the cable but also even in the layer outside the center; the sensor P-fiber and the sensor T-fiber can be protected from a substance called "proppant", which is predominantly composed of sand and contained in a measurement target fluid such as water and oil, because these sensor fibers are not arranged in the outermost layer; and the life-time of the optical fibers can be extended because the infill of the gel has capability of absorbing hydrogen.

It should be noted that each embodiment of the present invention may be freely combined or appropriately modified and omitted within the scope and the spirit of the invention. For example, while the P-fiber is described as a pressure sensor, a strain can also be determined on the basis of the pressure measured with the fiber.

Moreover, while the center wiring tube and the cylindrical metal sheath tube at the center shown in FIGS. 4, 6, 11 are described as having an outer diameter larger than that of the wires arranged in the outer layers, having not necessarily such a different outer diameter but having a diameter comparable to that of the wires in the outer layers also brings about the same effect. Furthermore, if the cylindrical metal sheath tubes have not a cylindrical shape but as far as have a cylindraceous shape bring about the same effect. Still furthermore, while the cylindrical metal sheath tubes are described as being made of stainless steel as an example, a metal sheath tubes made of steel also bring about the same effect.

REFERENCE NUMERALS

1: P-fiber (pressure sensing fiber);
2: infill;
3,7: cylindrical metal sheath tube;
4,5: wires;
6: T-fiber (temperature sensing fiber);
8: holes;
9: injection holes;
10: FIMT (accommodating P-fiber);
11: pressure blocking sections;
11a: pressure block;
12: pressure sensing sections;
13: center wiring tube;
14: interlayer infill;
15: dummy wires;
20: FIMT (accommodating T-fiber); and
100, 200, 300: DPTSS cable.

The invention claimed is:

1. A fiber optic cable for measuring pressure, temperature, and strain distributions comprising:
    an inner layer formed of an optical fiber sheathing metal tube and metal wires supporting the optical fiber sheathing metal tube, the optical fiber sheathing metal tube and the metal wires being mixedly arranged coaxially about an center axis of the fiber optic cable; and
    an outer layer formed of a plurality of metal wires arranged coaxially with the inner layer to surround the inner layer,
    wherein the inner layer and the outer layer are formed into a multilayer strand structure, and the strand structure has pressure blocking sections formed at intervals in an axial direction of fiber optic cable, to block an influence of a pressure propagating in the axial direction of fiber optic cable; and
    wherein the optical fiber sheathing metal tube accommodates a pressure sensor optical fiber for measuring a pressure distribution of a measurement target on the basis of frequency changes of Brillouin scattering and Rayleigh scattering of pulse laser light entered into the sensor optical fiber, and is formed to have through holes.

2. The fiber optic cable for measuring pressure, temperature, and strain distributions of claim 1, wherein clearance spaces between the inner layer and the outer layer in the pressure blocking sections are filler with an interlayer infill.

3. The fiber optic cable for measuring pressure, temperature, and strain distributions of claim 1, wherein at least one of the holes is formed in the optical fiber sheathing metal tube at a position in each of measurement sections where a pressure distribution of the measurement target are to be measured in the axial direction of the fiber optic cable.

4. The fiber optic cable for measuring pressure, temperature, and strain distributions of claim 1, wherein a portion between the pressure sensor optical fiber and the optical fiber sheathing metal tube is annularly filled with infill so that the infill is contact with a surface of the pressure sensor optical fiber.

5. The fiber optic cable for measuring pressure, temperature, and strain distributions of claim 4, wherein the infill is in contact with an inner surface of the optical fiber sheathing metal tube accommodating the pressure sensor optical fiber.

6. The fiber optic cable for measuring pressure, temperature, and strain distributions of claim 4, wherein the infill is gel, resin, or low temperature solder.

7. The fiber optic cable for measuring pressure, temperature, and strain distributions of claim 5, wherein the infill is gel, resin, or low temperature solder.

* * * * *